US006643630B1

(12) United States Patent
Pegatoquet et al.

(10) Patent No.: US 6,643,630 B1
(45) Date of Patent: Nov. 4, 2003

(54) APPARATUS AND METHOD FOR ANNOTATING AN INTERMEDIATE REPRESENTATION OF AN APPLICATION SOURCE CODE

(75) Inventors: Alain Pegatoquet, Nice (FR); Michel Auguin, Cagnes s/Mer (FR); Olivier Sohier, Valbonne (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/548,398

(22) Filed: Apr. 13, 2000

(51) Int. Cl.[7] .................................................. G06N 5/00
(52) U.S. Cl. ......................................... 706/45; 717/156
(58) Field of Search ....................... 706/3, 45; 712/236, 712/30; 717/156

(56) References Cited

U.S. PATENT DOCUMENTS

| 5,535,393 | A | 7/1996 | Reeve et al. ................. | 395/700 |
|---|---|---|---|---|
| 5,862,383 | A | 1/1999 | Laitinen ....................... | 395/708 |
| 5,933,641 | A | 8/1999 | Ma .............................. | 395/705 |
| 5,966,143 | A | 10/1999 | Breternitz, Jr. ............. | 345/709 |

OTHER PUBLICATIONS

Pegatoquet, Alain et al, Rapid Development of Optimized DSP Code from a High Level Description Through Software Estimations, Proceedings of the 36th Conference on Design Automation, New Orleans, LA, USA, Jun. 21–25, 1999. ACM Press, 1999, pp. 823–826.*

Wilken, Kent et al, Optimal instruction scheduling using integer programming, Conference on Programming Language Design and Implementation, Proceedings of the ACM SIGPLAN 2000 conference on Programming language design and implementation, 2000, Vancouver.*

Akturan, Cagdas, et al, FDRA: a software–pipelining algorithm for embedded VLIW processors, International Symposium on Systems Synthesis, Proceedings of the 13th international symposium on System synthesis, 2000, Madrid, Spain, ACM Press, New York, NY, US.*

* cited by examiner

Primary Examiner—Wilbert L. Starks, Jr.
(74) Attorney, Agent, or Firm—Peter Zawilski

(57) ABSTRACT

A performance evaluation apparatus is provided for annotating by priority level a DSP intermediate representation (DIR) of an application source code. The DIR includes nodes, leaf nodes and heading nodes, wherein the heading nodes represent data ready operations. The apparatus includes a host computer, a target digital signal processor (DSP) compiler, and a DSP Intermediate Representation (DIR) annotation algorithm. The host computer includes processing circuitry, memory and a host compiler to use test sequences and generate dynamic information. The target digital signal processor compiler communicates with the processing circuitry. The DSP Intermediate Representation (DIR) annotation algorithm is implemented on the host processing circuitry and is operative to annotate application source code by giving priority to operations that allow more distant leaf nodes to be scheduled earlier. Accordingly, nodes with high priority levels are scheduled first, enabling extraction of target DSP pipeline parallelism. A method is also provided.

28 Claims, 6 Drawing Sheets

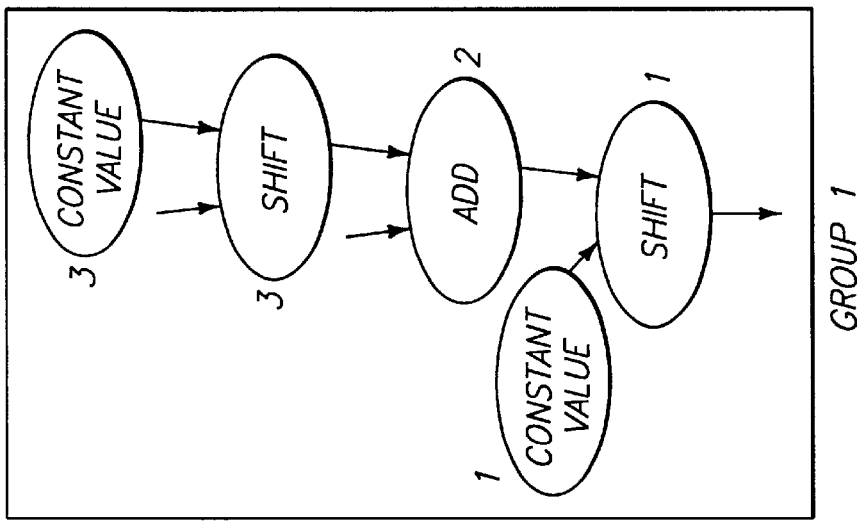
GROUP 1
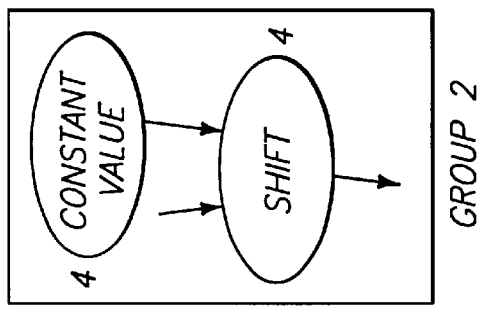
GROUP 2
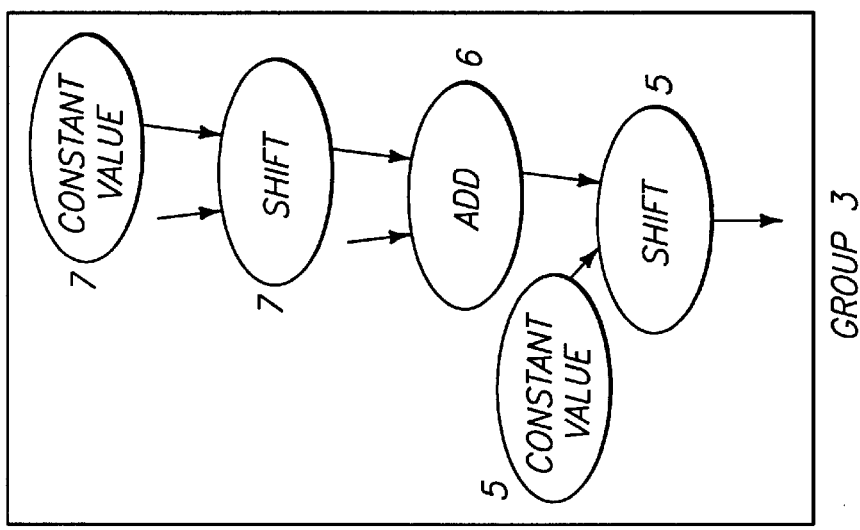
GROUP 3
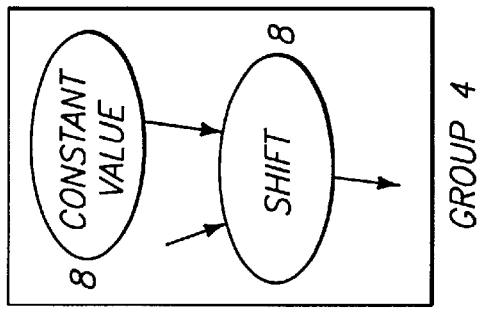
GROUP 4
FIG. 4

APPARATUS AND METHOD FOR ANNOTATING AN INTERMEDIATE REPRESENTATION OF AN APPLICATION SOURCE CODE

TECHNICAL FIELD

This invention pertains to digital data processing and compiler systems. More particularly, this invention relates to techniques for performing an estimation of an optimized assembly code from the C code of an application that is delivered to a C compiler.

BACKGROUND OF THE INVENTION

The programming of digital signal processor (DSP) applications in high level languages such as C is becoming more prevalent as applications become increasingly more complex. However, current DSP C compilers are generally unable to exploit numerous DSP specific architectural features when attempting to produce efficient assembly code. Therefore, in order to respect tight real-time constraints, programmers commonly write DSP code by hand. However, the programming of such code in assembly language has become increasingly difficult since DSP applications are becoming larger and more complex. Furthermore, the writing of efficient assembly code for new DSP architectures, such as for a Very Long Instruction Word (VLIW) processor, presents a very challenging task.

SUMMARY OF THE INVENTION

A tool is provided for estimating an optimized assembly code from the C code of an application. An ability is provided to locate computationally intensive parts of the application. Furthermore, the tool provides a metric of the quality of the produced assembly code. More particularly, an estimation of a hand-written assembly code is generated from an intermediate description (RTL) of an application.

According to one aspect, a performance evaluation apparatus is provided for annotating by priority level a DSP intermediate representation (DIR) of an application source code. The DIR includes nodes, leaf nodes and heading nodes, wherein the heading nodes represent data ready operations. The apparatus includes a host computer, a target digital signal processor (DSP) compiler, and a DSP Intermediate Representation (DIR) annotation algorithm. The host computer includes processing circuitry, memory and a host compiler to use test sequences and generate dynamic information. The target digital signal processor compiler communicates with the processing circuitry. The DSP Intermediate Representation (DIR) annotation algorithm is implemented on the host processing circuitry and is operative to annotate application source code by giving priority to operations that allow more distant leaf nodes to be scheduled earlier. Accordingly, nodes with high priority levels are scheduled first, enabling target DSP pipeline parallelism to be extracted.

According to another aspect, a performance evaluation apparatus is provided for annotating by priority level a DSP intermediate representation (DIR) of an application source code. The DIR includes nodes, leaf nodes and heading nodes, wherein the heading nodes represent data ready operations. The apparatus includes a host computer, a target DSP compiler, and an annotation algorithm. The host computer includes processing circuitry, memory and a host compiler. The host compiler is operative to execute the program using test sequences and generate dynamic information. The target digital signal processor (DSP) compiler communicates with the processing circuitry. The annotation algorithm is implemented on the host processing circuitry and is operative to annotate application source code by giving priority to operations that allow more distant nodes to be scheduled earlier such that nodes with high priority levels are scheduled first, enabling target DSP pipeline parallelism to be extracted.

According to yet another aspect, a method is provided for annotating a DSP Intermediate Representation (DIR) for a program source code. The method includes: providing an application C source code; generating a DIR of the application C source code suitable to estimate a class of modified Harvard DSP architectures; calculating a priority level comprising a cycle-based distance between a node and a most distant leaf node of the DIR; and annotating each node of the DIR by the calculated priority level.

BRIEF DESCRIPTION OF THE DRAWINGS

Preferred embodiments of the invention are described below with reference to the following accompanying drawings.

FIG. 4 is a graphical depiction of annotation for an OakDSPCore™ according to a first example.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

An apparatus and a method are provided for generating software estimates which assist programmers using a target C compiler such that the compiler can be used more efficiently, and the programmer is only required to write a minimal amount of assembly code.

A first tool is provided that enables the generation of estimations of an optimized assembly code which acts as a reference measure for the programmer during implementation of an application on a DSP. Details of such tool are disclosed in Applicant's co-pending U.S. patent application Ser. No. 09/549,234, entitled "Assembly Code Performance Evaluation Apparatus and Method", naming inventors as Alain Pegatoquet, Michel Auguin, and Olivier Sohier, filed concurrently herewith, and herein incorporated by reference. According to the above first tool, a set of rewriting rules is then applied to an intermediate RTL representation in order to match as closely as possible a DSP execution scheme. Such an intermediate representation allows accurate estimates for a class of DSP architectures to be obtained.

A second tool includes an apparatus for annotating, or scheduling, by priority level a DSP intermediate representation (DIR), according to the present invention as will be described below in greater detail.

Reference will now be made to a preferred embodiment of Applicant's invention. One exemplary implementation is described below and is depicted with reference to the drawings comprising the second tool for annotating, or scheduling by priority level, a DSP intermediate representation (DIR). While the invention is described via a preferred embodiment, it is understood that the description is not intended to limit the invention to this embodiment, but is intended to cover alternatives, equivalents, and modifications such as are included within the scope of the appended claims.

In an effort to prevent obscuring the invention at hand, only details germane to implementing the invention will be described in great detail, with presently understood peripheral details being incorporated by reference, as needed, as being presently understood in the art.

Figure 1:
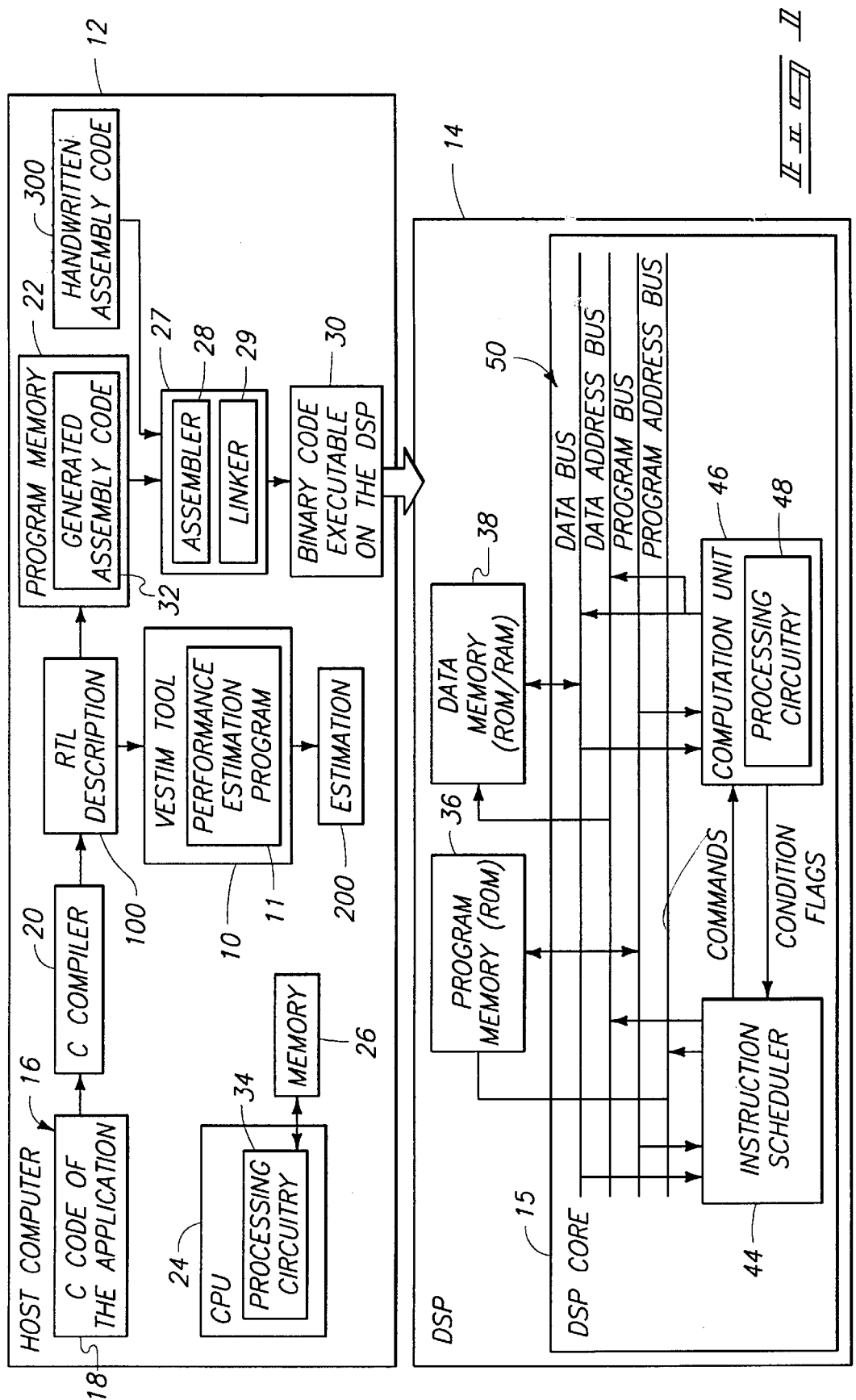
FIG. 1 is a schematic block diagram illustrating a host computer, including a performance evaluation tool including an apparatus for annotating, or scheduling by priority level, a DSP intermediate representation (DIR), and a digital signal processor (DSP).

FIG. 1 illustrates a program tool, hereafter referred to as a VESTIM tool, identified by reference numeral 10. Tool 10 is provided in a host computer 12, and includes a performance estimation program 11. Host computer 12 is signal coupled to interact with a digital signal processor (DSP) 14. Host computer 12 includes a software application program 16 rendered in C code 18; a C compiler 20; a Register Transfer Language (RTL) description 100; program memory 22; a central processing unit (CPU) 24; memory 26; translation programs 27, including an assembler 28 and a linker 29; binary code 30 that is executable on DSP 14; a VESTIM tool 10; an estimation 200 of an optimized assembly code; and handwritten assembly code 300.

As shown in FIG. 1, assembly code 32 is first stored in host program memory 22. According to one construction, program memory 22 comprises random access memory (RAM) and/or read only memory (ROM). Additionally, CPU 24 comprises processing circuitry 34.

DSP 14 has a construction that can benefit from the present invention. DSP 14 includes a DSP core 15, a program memory (ROM) 36, a data memory (ROM/RAM) 38. DSP core 15 includes an instruction scheduler 44, a computation unit 46, and internal buses 50. Computation unit 46 includes processing circuitry 48.

According to one construction, program memory 36 is formed at least in part from a read only memory (ROM). Other alternative forms of memory are also possible as understood in the art. Also according to one construction, data memory 38 is formed from read only memory (ROM) and/or random access memory (RAM).

DSP core 15 includes instruction scheduler 44, computation unit 46, and internal buses 50. Internal buses 50 comprise a data bus, a data address bus, a program bus, and a program address bus.

Computation unit 46 comprises processing circuitry 48, such as a central processing unit (CPU). In operation, instruction scheduler 44 sends commands to computation unit 46, and computation unit 46 sends condition flags to instruction scheduler 44.

According to one construction, DSP 14 comprises a special-purpose CPU that is typically used for digital signal processing. Such special-purpose CPU, realized via computation unit 46 and processing circuitry 48, provides ultra-fast instruction sequences, such as shift and add, and multiply and add, which are typically utilized in math-intensive signal processing applications. DSPs, such as DSP 14 of FIG. 1, are used in a wide variety of devices, including cellular telephones, sound cards, modems, fax machines, and digital televisions.

In an effort to minimize the amount of assembly code 300 that is written by hand so as to reduce the time-to-market for a DSP product, a methodology has been developed by Applicant which is detailed below. The methodology entails making more efficient usage of DSP C compilers, such as C compiler 20 of FIG. 1.

In order to make more efficient usage of C compilers, performance improvements needed to be realized for assembly code 32 that is generated by C compiler 20. More particularly, the quality of code 32 that is generated by C compiler 20 is very dependent on the C code 18 of an application, and improvements to such code 18 are needed in order to more efficiently use C compiler 20.

By implementing a technique that respects defined C coding rules when designing C code of the application 18, the performance of the generated assembly code 32 may be significantly improved. Moreover, it is well known that, for numerous signal processing applications, a percentage of only 20% to 30% of the C code 18 represents about 80% to 90% of the computational requirements when a program is implemented on DSP 14. Hence, optimization efforts will be focused on this computationally intensive 20% to 30% of C code 18.

Such relatively critical portions of C code 18 are typically found to comprise a series of inner nested loops. Tools like "gprof" or "tcov" may be used to profile a C code, as described below.

The "gprof" tool, or program, produces an execution profile of a C program. This profile gives the total execution time and call count for each function of the application. However, results provided by "gprof" are obtained from an execution on the host processor (e.g., a Pentium II). Applicant's experiments have shown that the performance obtained using "gprof" is significantly different from the results obtained in simulation for the target DSP assembly code (with the same input file). This is because one cannot expect to obtain similar performance measures (and similar percentage per function) if the host (where "gprof" runs) and the target architecture (here a DSP) are too different.

The "tcov" program provides only the number of times each C statement is executed, not execution times. This information is therefore not usable to locate with accuracy critical functions of the application.

In order to assist programmers, a specific tool is provided by Applicant's invention, hereinafter referred to as VESTIM. VESTIM tool 10 has been developed so as to provide two kinds of estimation. First, VESTIM tool 10 provides a performance evaluation of the assembly code 32 that is generated by C compiler 20. Results of the performance evaluation are given in a table, at the function or basic block level, making it easier to locate critical parts of the application program 16. Secondly, VESTIM tool 10 provides via an intermediate representation, or RTL description 100, an optimized assembly code in the form of estimation 200. That is, VESTIM tool 10 provides an estimation 200 of an optimized assembly code via performance estimation program 11 that appears as if the assembly code had been handwritten by an experienced programmer. The estimation provides a metric, or measurement, that represents a lower bound on execution times. The metric provides an asymptotic value that is compared with the generated assembly code 32. As a result, it becomes easier to determine if C compiler 20 has produced an efficient code 32.

One benefit provided by implementing Applicant's technique results in that the above-described measures are provided without having to execute any time-consuming target DSP simulation. Accordingly, execution time to arrive at the estimation 200 of an optimized assembly code is greatly decreased over what it would take if target DSP simulations were used.

A further goal of Applicant's technique is to reduce the software development time for writing a handwritten assembly code 300, thereby reducing the time-to-market for a resulting product, as will be described below in greater detail.

One technique for reducing the time used to write assembly code 300 is to maximize use of C compiler 20 (of FIG. 1). As a result, a developer will reduce the amount of assembly code 300 that is written by hand to the minimum level possible, thereby reducing the time-to-market. The quality of generated assembly code 32 can be improved by tuning the original C source code 18 to best match the target compiler (see FIG. 2), that is the target DSP 14. As shown in FIG. 1, it is understood that C compiler 20 corresponds with a target compiler within DSP 14.

For example, the use of pointers instead of indexed arrays improves the performance of code 32 that is generated by C compiler 20 via RTL description 100. It is also possible to reduce overhead by limiting variable life range or specifying data location in different memory banks, such as in XRAM or YRAM memory banks.

Furthermore, in order to assist a compiler 20 in its optimization process, C coding rules can be derived for a target DSP 14. But without any specific tools, the profiling of the generated assembly code becomes a tedious task that requires the use of time-consuming target processor simulations. In order to guide a programmer from the C description 18 of an application 16, the VESTIM tool 10 (a) locates computationally intensive parts of the code; and (b) provides a metric, or measurement, of the quality of the produced assembly code.

Accordingly, VESTIM tool 10 of Applicant's invention allows for the identification of target blocks of C code 18 for optimization. Furthermore, VESTIM 10 tool allows for parts of C code 18 being efficiently compiled, or being compiled without having a significant, detrimental influence on global performance to be identified. Additionally, VESTIM tool 10 provides estimation for a code program size. A high code density is particularly desired when machine code is stored on a chip since such density contributes to a relatively low silicon area, and thus low system cost, and low power dissipation.

As described below, an estimation technique and method is globally detailed. Subsequently, a set of rules is presented in order to obtain a DSP oriented computational scheme using the apparatus detailed in FIG. 1.

According to the construction depicted in FIG. 1, it is understood that DSP C compilers are generally unable to produce an efficient assembly code that respects tight real-time constraints when designing and implementing embedded applications. For example, such tight real-time constraints are encountered when designing cellular telephone systems. Accordingly, this is the reason why programmers commonly write DSP code by hand. The writing of handwritten assembly code has become more and more unacceptable because applications, as well as recent DSP architectures, are becoming more and more complex. The use of performance estimations that are provided by Applicant's VESTIM tool makes it possible to more efficiently use a C compiler, thereby enabling a designer/programmer to write less assembly code by hand.

As shown in FIG. 1, an application will generally be formed by a mix between assembly code generated by a C compiler and assembly code that is written by hand. Applicant's VESTIM tool is used to reduce the handwritten portion, typically formed from inner loops, to a minimum level, thereby reducing the time-to-market encountered in designing a product.

I. Estimation Method

Figure 2:
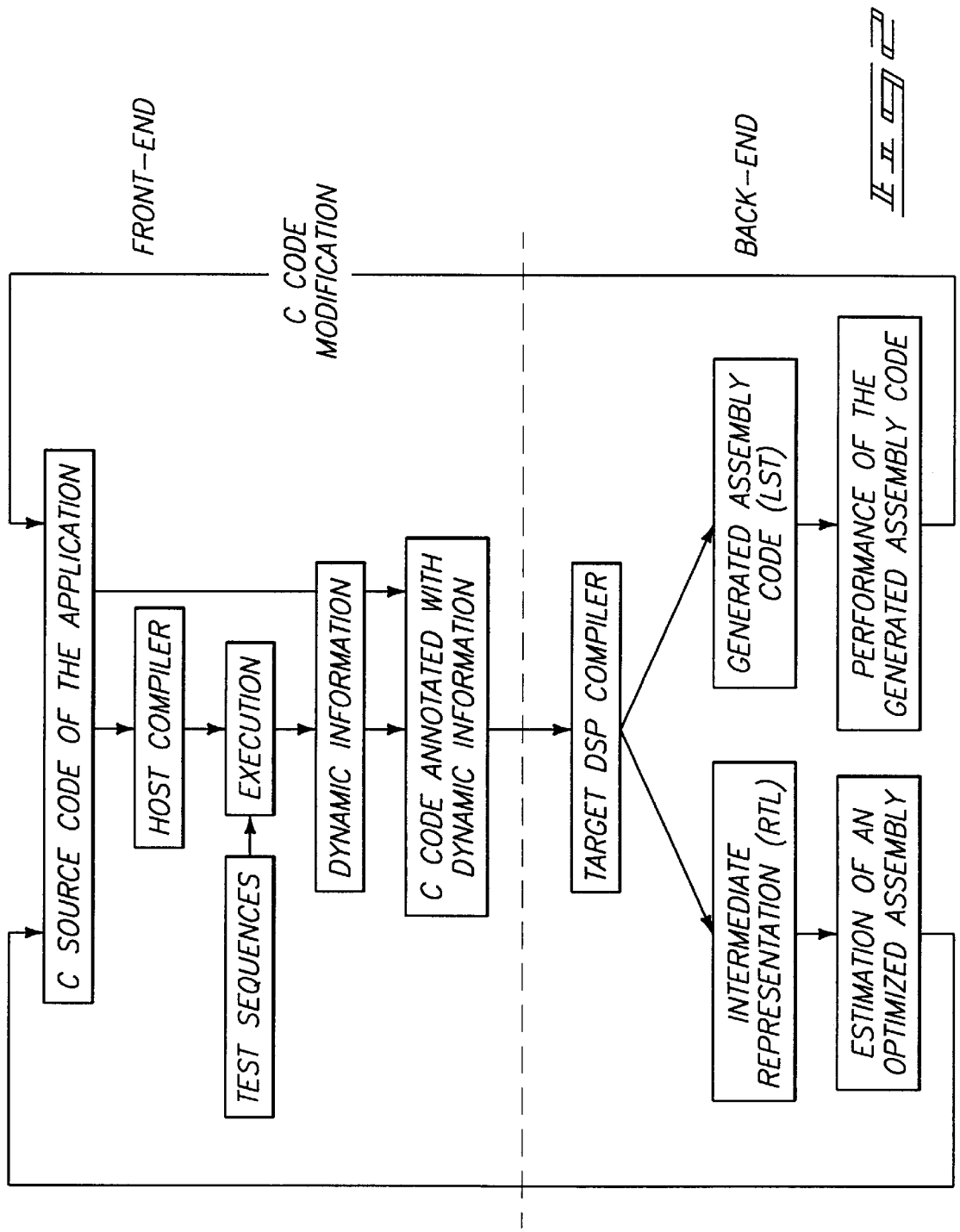
FIG. 2 is a block diagram illustrating global flow for the performance evaluation tool of FIG. 1 provided by the present invention.

FIG. 2 illustrates in block diagram form the estimation process of Applicant's VESTIM tool 10 (of FIG. 1). As shown in FIG. 2, the estimation process is shown divided into two independent parts: a "front-end" and a "back-end". In order to perform estimations, dynamic information is first collected. The dynamic information represents the number of executions of each C statement (or group of C statements present within a basic block). It is understood that a basic block represents a sequence of instructions with no breaking point (i.e., without any control). In other words, a basic block has a single ENTRY point and a single EXIT point, and may also have several connected components. In VESTIM, a basic block is represented by a Data Flow Graph (DFG). Each node of a DFG is an operation, while edges represent data dependencies between these operations.

Dynamic information may be obtained using different approaches. Some authors propose a "static" method (i.e., techniques that use results of information collected at or before compile time). However, this method requires the programmer to provide information such as loop upper bounds. From an industrial point of view, this approach is inappropriate for complex applications having deeply interdependent or nested control structures. Therefore, Applicant's technique uses a "statistical" approach (also called "dynamic") in order to collect dynamic information.

A. Collecting Dynamic Information (Front-End)

A method is adapted based on the execution of the C code with a test sequence. The C code is then annotated with this dynamic information. The test sequence coverage must correspond to a good approximation of the worst case execution time. As shown in FIG. 2, Applicant's VESTIM tool 10 (of FIG. 1) provides: (1) performance of the generated assembly code (LST); and (2) estimation of a handwritten assembly code from an intermediate description (Register Transfer Language, or RTL) of the application.

The metrics shown in FIG. 2 are obtained without any target DSP simulation, which avoids the need to conduct time-consuming profiling simulation.

B. Performance of the Generated Assembly Code (LST)

Performance of the generated assembly code is obtained by multiplying the dynamic information with the number of cycles to execute instructions of the generated assembly code (LST) for each C statement of the application.

C. Estimation of an Optimized Assembly Code

In order to evaluate the quality of the LST code, a computation is made of a lower performance bound from the RTL intermediate representation of the application provided by, for example, a GNU based OakDSPCore™ C Compiler (OCC). The lower performance bound represents an estimation of an optimized handwritten assembly code.

The RTL level is composed of different passes where most of the work of the compiler is performed. When using the VESTIM tool, a specific pass is used in the RTL flow where traditional optimization techniques are implemented, but before the register allocation phases. Thus, problems related to memory spilling are avoided because this pass uses a large number of virtual registers. This pass also includes extensions added to the C language, such as the distribution of data in DSP memories, but this pass remains very OakDSPCore™ independent. The VESTIM tool is thus generic to a class of modified Harvard type DSP architectures.

Figure 3:
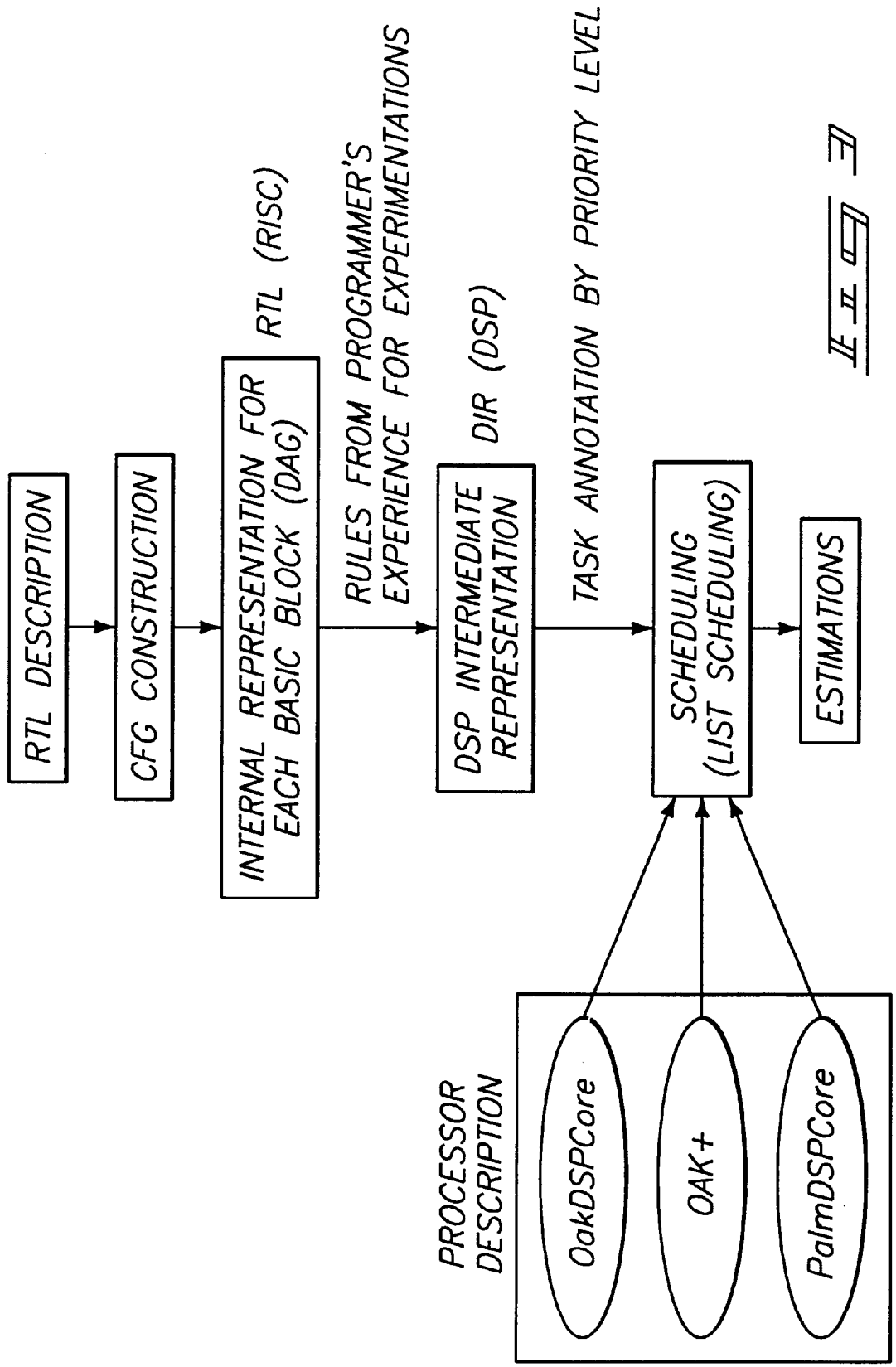
FIG. 3 is a block diagram illustrating the estimation flow from an RTL description.

FIG. 3 shows the estimation flow from an RTL description and comprises the "back-end" left portion of FIG. 2. First, a control flow graph (CFG) representing the structure of the application is built. A CFG describes the control flow of each basic block of a program. Each basic block has its own dynamic information. The estimation process will determine the number of cycles for each basic block for a target DSP processor.

In order to support a class of modified Harvard type DSP architectures, an internal generic processor model is adopted. The target DSP is described using an external processor description. Applicant's DSPs designed by VLSI Technology, Inc., now Philips Semiconductors Corporation, and identified by model numbers VVF3500 and VVF4000 DSPs, which stand respectively for the DSP Group OakDSPCore™ and PalmDSPCore™ are the first DSPs included in the estimator.

D. A DSP Oriented Computational Scheme

During experiments it was noted that accurate estimation could not be performed using the RTL representation since it is RISC (Reduced Instruction Set Computer) oriented in the GNU C compiler. RISC architectures have a load-store model: each memory access or operation is performed through registers. However, for many DSPs this is a restrictive model leading to unnecessary operations. Moreover, the RTL representation contains operations not optimized by the compiler; i.e., operations that an experienced DSP programmer rarely uses.

At this point, a set of rewriting rules was defined. This set of rewriting rules is applied to the RTL representation in order to obtain a DSP Intermediate Representation (DIR) adapted to perform software estimations (see FIG. 3).

E. DIR Annotation by Priority Level

Before the scheduling phase, each node of the DIR is annotated by a priority level (see FIG. 3). This number is equal to the cycle-based distance between this node and the most distant leaf node of the DIR. This cycle-based distance takes into account the pipeline parallelism of the DSP: two sequential nodes in the DIR have the same priority level if they can have a pipeline or parallel execution in the DSP. The annotation gives priority to operations that allow more distant leaf nodes to be scheduled earlier since nodes with high priority levels are scheduled first. Depending on the target DSP parallelism, the data flow graph representing a basic block is annotated, or scheduled, in different ways.

A connected component (CC) is a part of a Data Flow Graph (DFG) without data dependencies with other parts of the DFG (i.e., with other connected components). When scheduling a connected component (CC), nodes must be annotated in such a way that they are going to be optimally gathered (i.e., get the maximum of parallelism). For a DSP with a high level of parallelism, it becomes necessary to simultaneously schedule several connected components (CCs).

The DSP Intermediate Representation (DIR) annotation algorithm is made up of the "Main" and the "SetPriority" functions. At the beginning of the algorithm, all the nodes of the DIR are set to have a priority level of zero.

Main Function (Pseudocode)
Description: This function manages for each basic block of each function, connected components and the priority level of all LEAF nodes.

```
BEGIN
   FOR (all functions of the application)
      FOR (all Basic Blocks of the function)
         Priority_cpt = 0;
         FOR (all Groups⁽¹⁾ of the DIR)
            FOR (all Connected Components (CCs) of the Group)
               Priority_cpt = Priority level max of the previous
                              group (the priority level is equal to 0
                              for the first group) + 1;
               Point to the LEAF node of the current CC;
               Call SetPriority (current_Node, Priority_cpt);
            EndFOR
         EndFOR
      EndFOR
   EndFOR
End
```

Figure 5:
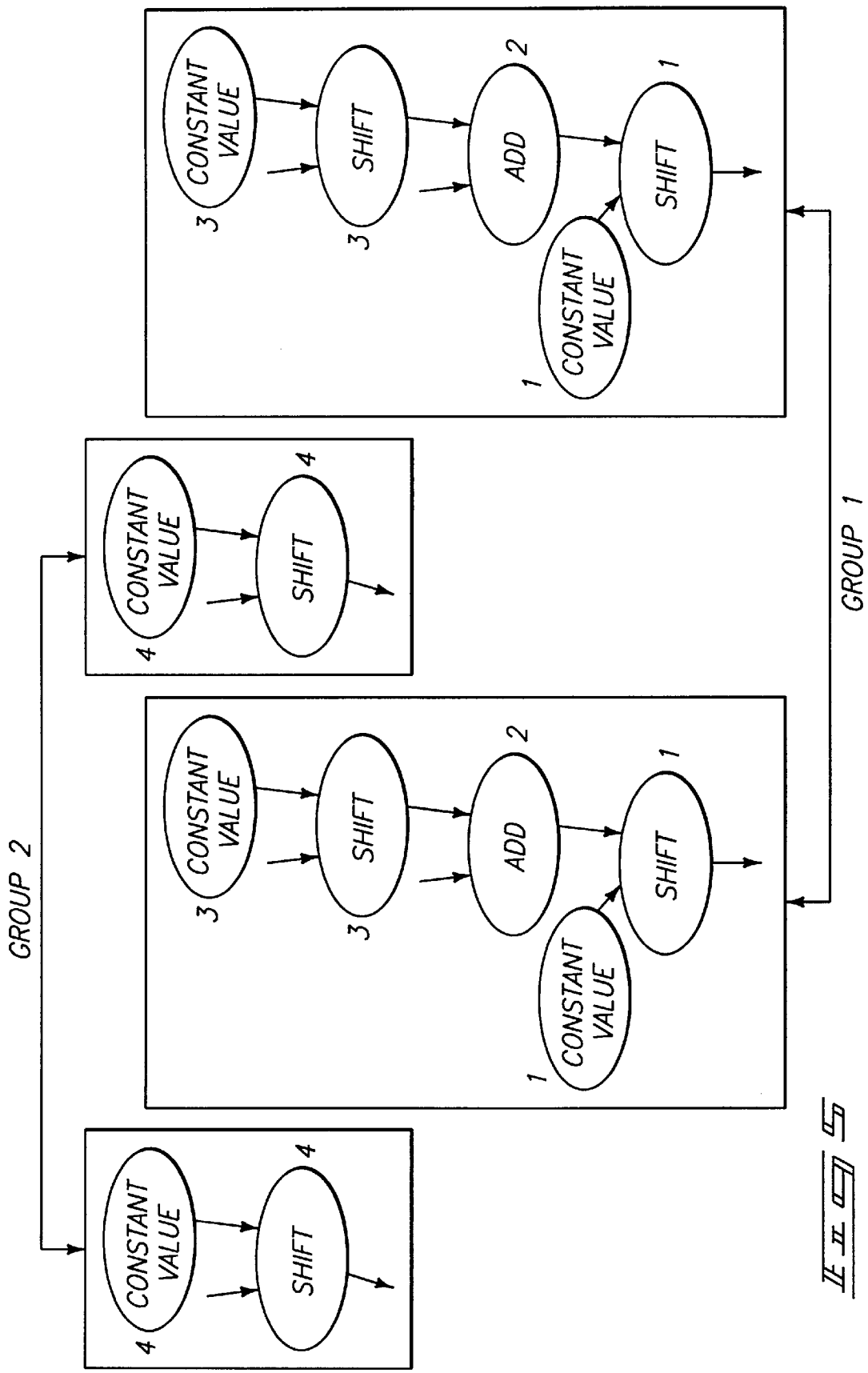
FIG. 5 is a graphical depiction of annotation for a PalmDSPCore™ according to the first example.

⁽¹⁾Depending on the pipeline parallelism of the target DSP architecture, a group is composed of different numbers of CCs:

For the OakDSPCore™
→Each Group is composed of one CC (see FIG. 4).
For the PalmDSPCore™
→Each Group is composed of two CCs (see FIG. 5). Groups are chosen after the depth computation of each CC. A group contains two CCs that have close depth value (Group 1/Group 2 in FIG. 5).

SetPriority($1^{st}$ Parameter: a Node (Pointed Node), $2^{nd}$ Parameter: a Priority Level (Level Cpt)) Function
Description: This function annotates by priority level each node of a CC. It starts from a LEAF node and goes recursively to the HEADING nodes of the graph, then back recursively to successor nodes which still have not been annotated by a priority level. (HEADING nodes are nodes with no previous node. See FIG. 6.)

```
BEGIN
   IF (the Priority level of the pointed node is lower than level_cpt)
      (assuming that all nodes have a priority level initialized to zero)
      THEN
      Update the priority level of the pointed_node with level_cpt;
      FOR (all direct predecessors' nodes of the pointed_node)
         IF (the direct predecessor node may be scheduled in parallel
             with the pointed_node⁽²⁾) THEN
            Call SetPriority (direct predecessor node, level_cpt)
         ELSE
            Call SetPriority (direct predecessor node, level_cpt + 1)
         ENDIF
      ENDFOR
      FOR (all direct successor nodes of the pointed_node)
         IF (the direct successor node has a priority level equal to
             0, which means that this node has not yet been annotated)
            THEN
            Call SetPriority (direct successor node, Priority level max of
               the previous group + 1)
         ENDIF
      ENDFOR
   ENDIF
END
```

⁽²⁾ Here are all the cases of parallelism for the OakDSPCore ™:
(a) Whatever the current node is, if the previous one is either a "memory read" operation or a "constant value", these nodes may be scheduled in parallel (see FIG. 4).
(b) If the current node is an "addition or subtraction" operation and if the previous node is a "multiplication", then thy can be scheduled in parallel.

II. Conclusions

In conclusion, software estimations provided by Applicant's VESTIM tool assist programmers to use a target C compiler more efficiently and write as little assembly code as possible. Estimations of an optimized assembly code act as a reference measure for the programmer during the optimization process. The specific DIR annotation by priority level allows target DSP pipeline parallelism to be extracted. This approach allows time-to-market to be significantly reduced. For example, with a G.728 Annex G application, which is a speech compression algorithm standardized by the International Telecommunication Union (ITU), it has been shown that by using estimations provided by the VESTIM tool, the implementation time can be reduced by two-thirds compared to a purely hand-coded implementation (i.e., three weeks instead of two months of work).

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

APPENDIX "A"—Definitions

Figure 6:
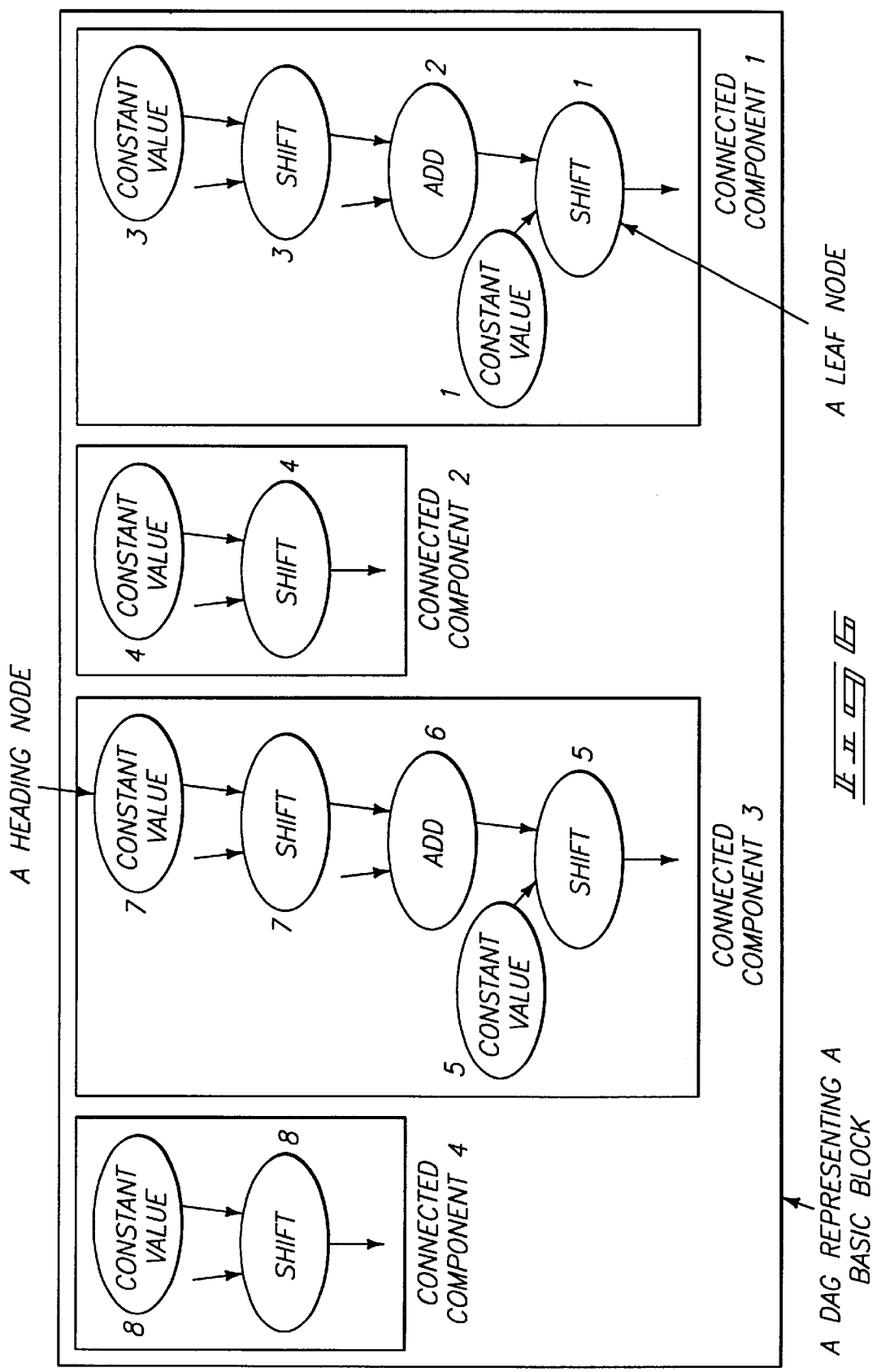
FIG. 6 is a graphical depiction of a second exemplary DAG representing a basic block and corresponding with definitions provided in Appendix A.

Note: FIG. 6 Provides Graphical Explanation.
- A. Control Flow Graph (CFG)—A CFG describes the control flow of each basic block of a program.
- B. Basic Block—A basic block represents a sequence of instructions with no breaking point (i.e., without any control). In other words, a basic block has: a single entry point; and a single exit point. A basic block may have several connected components. In the VESTIM tool, a basic block is represented by a Data Flow Graph (DFG). Each node of a DFG is an operation, while edges represent data dependencies between these operations. FIG. 6 represents a basic block composed of 14 nodes and four connected components.
- C. Connected Component (CC)—A connected component is a part of a DFG without data dependencies with other parts of the DFG (i.e., with other connected components).
- D. Directed Acyclic Graph (DAG)—A DAG is a directed DFG without any cycle.
- E. Leaf node—A leaf node is a node with no successor node (see FIG. 6).
- F. Heading node—A heading node is a node with no previous node (see FIG. 6).

What is claimed is:

1. A performance evaluation apparatus for annotating by priority level a DSP intermediate representation (DIR) of an application source code, the DIR including nodes, leaf nodes and heading nodes, wherein the heading nodes represent data ready operations, comprising:
    a host computer having processing circuitry, memory and a host compiler to use test sequences and generate dynamic information;
    a target digital signal processor compiler communicating with the processing circuitry; and
    a DSP Intermediate Representation (DIR) annotation algorithm implemented on the host processing circuitry and operative to annotate application source code by giving priority to operations that allow more distant nodes to be scheduled earlier such that nodes with high priority levels are scheduled first, enabling extraction of target DSP pipeline parallelism.

2. The apparatus of claim 1 wherein the DIR comprises a Directed Acyclic Graph (DAG) of the application.

3. The apparatus of claim 1 wherein the DAG is suitable to estimate a class of modified Harvard DSP architectures.

4. The apparatus of claim 1 wherein the DSP has a high level of parallelism, and a plurality of connected components (CCs) are scheduled.

5. The apparatus of claim 1 wherein annotating comprises scheduling connected components (CCs).

6. The apparatus of claim 1 wherein the nodes are annotated to optimally gather the nodes and extract a maximum level of parallelism between the nodes.

7. The apparatus of claim 1 wherein the DIR annotation algorithm comprises a main function operative to manage, for each basic block of each function, connected components, and a priority level for all leaf nodes.

8. The apparatus of claim 1 wherein the DIR annotation algorithm comprises a SetPriority function comprising two parameters.

9. The apparatus of claim 8 wherein a first parameter is a node.

10. The apparatus of claim 9 wherein a second parameter is a priority level.

11. The apparatus of claim 1 wherein, for the DIR annotation algorithm, all the nodes of the DIR are initialized with a priority level of zero.

12. A performance evaluation apparatus for annotating by priority level a DSP intermediate representation (DIR) of an application source code, the DIR including nodes, leaf nodes and heading nodes, wherein the heading nodes represent data ready operations, comprising:
    a host computer having processing circuitry, memory and a host compiler, the host compiler operative to execute the program using test sequences and generate dynamic information;
    a target digital signal processor (DSP) compiler communicating with the processing circuitry; and
    an annotation algorithm implemented on the host processing circuitry and operative to annotate application source code by giving priority to operations that allow more distant nodes to be scheduled earlier such that nodes with high priority levels are scheduled first, enabling extraction of target DSP pipeline parallelism.

13. The apparatus of claim 12 wherein the annotation algorithm comprises a DSP Intermediate Representation (DIR) annotation algorithm.

14. The apparatus of claim 13 wherein the nodes are annotated to optimally gather the nodes and extract a maximum level of parallelism between the nodes.

15. The apparatus of claim 13 wherein the DIR annotation algorithm comprises a main function operative to manage for each basic block of each function, connected components, and a priority level for all leaf nodes.

16. The apparatus of claim 15 wherein the annotation algorithm comprises a main function operative to manage connected components for each basic block of each function.

17. The apparatus of claim 12 wherein the annotation algorithm comprises a SetPriority function including a node and a priority level.

18. The apparatus of claim 17 wherein the SetPriority function is operative to annotate by priority level each node of a connected component (CC) of a Data Flow Graph (DFG).

19. The apparatus of claim 18 wherein the Data Flow Graph (DFG) is a Directed Acyclic Graph (DAG).

20. The apparatus of claim 12 wherein the leaf node is a node with no successor nodes.

21. The apparatus of claim 12 wherein the heading node has no previous node.

22. A method of annotating a DSP Intermediate Representation (DIR) for a program source code, comprising:

providing an application C source code;

generating a DIR of the application C source code suitable to estimate a class of modified Harvard DSP architectures;

calculating a priority level comprising a cycle-based distance between a node and a most distant leaf node of the DIR; and annotating each node of the DIR by the calculated priority level.

23. The method of claim 22 wherein the cycle-base distance takes into account a pipeline parallelism of a DSP.

24. The method of claim 22 wherein two sequential nodes in the DIR have the same priority level if the nodes can have a pipeline or parallel execution in a DSP.

25. The method of claim 22 wherein annotating gives priority to operations that allow more distant leaf nodes to be scheduled earlier than less distant nodes.

26. The method of claim 22 wherein the data flow graph representing a basic block is annotated based upon connected components and the priority level of all leaf nodes.

27. The method of claim 22 wherein, for an OakDSPCore™, where a previous node is either a memory read operation or a constant value, the previous node and a present node are scheduled in parallel.

28. The method of claim 22 wherein, for an OakDSPCore™, where a current node is an addition or subtraction operation and if the previous node is a multiplication, the previous node and the current node are scheduled in parallel.

* * * * *